UNITED STATES PATENT OFFICE.

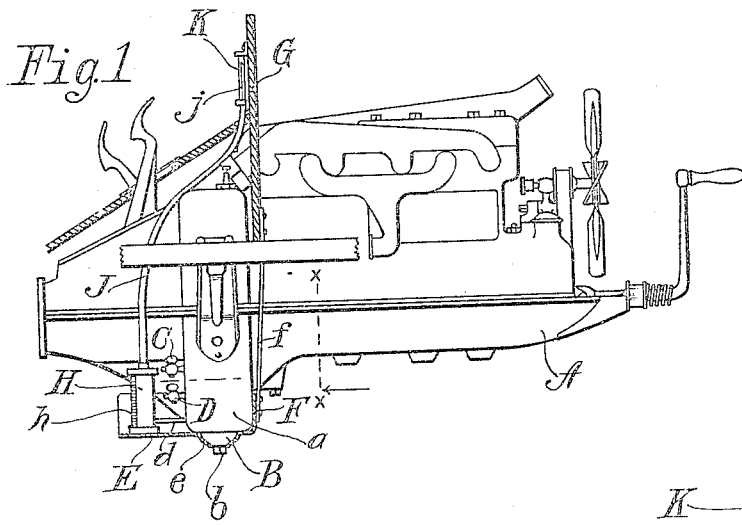
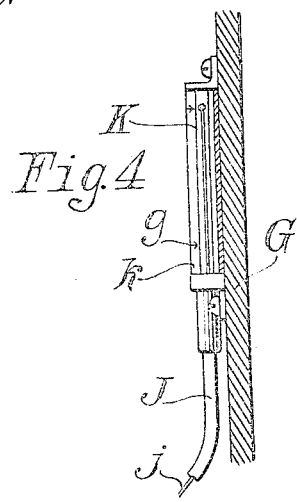
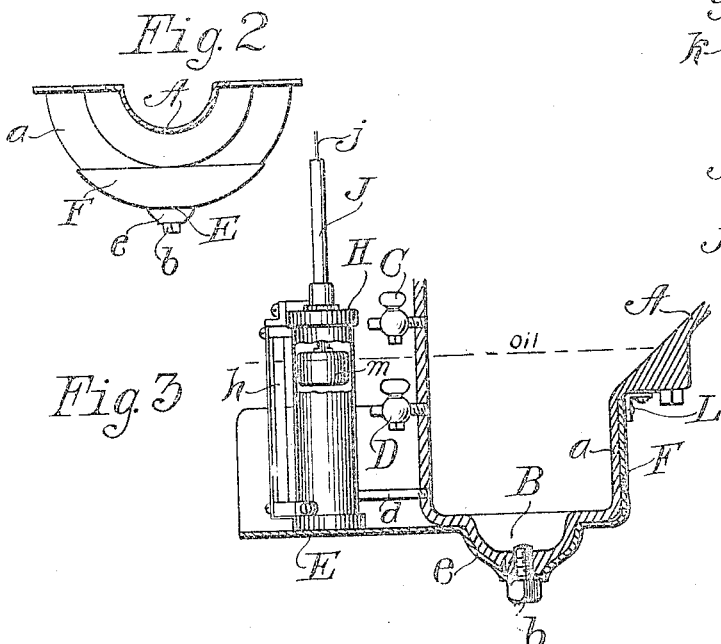

NOAH S. WRIGHT, OF EAST WORCESTER, NEW YORK.

MOTOR-OILER PROTECTOR.

1,227,728.　　　Specification of Letters Patent.　　Patented May 29, 1917.

Application filed February 23, 1916.　Serial No. 79,883.

*To all whom it may concern:*

Be it known that I, NOAH S. WRIGHT, a citizen of the United States, residing at East Worcester, in the county of Otsego and State of New York, have invented certain new and useful Improvements in Motor-Oiler Protectors, of which the following is a specification.

This invention relates to motor oiler protectors, and has for its object the production of a pan or shield so constructed and arranged as to present itself in the path of flying stones or obstructions of whatever nature, that might strike and injure the oil quantity indicating receptacles and attachments placed adjacent to and usually below and in rear of the crank case of a motor vehicle engine, to enable the operator to determine the depth or amount of lubricating oil in the crank case.

This invention is believed to be especially useful as an adjunct to motors of the Ford type, which possess a hollow cylindrical housing for the flywheel and its attachments. The housing extends below the remainder of the crank casing and this invention is fashioned with a rearwardly extending portion that carries the oil gage or indicator, at the same time inclosing the lower part of the flywheel housing and protecting not only the oil indicator or receptacle, but, also, the pet-cocks with which the housing is customarily equipped.

In the accompanying drawings illustrating the construction and the arrangement of the parts of this invention, Figure 1 represents a side view of an automobile motor of the Ford type, having this invention applied thereto. Fig. 2 is a vertical cross-section of the lower portion of the crank casing, on the broken line x—x of Fig. 1. The front wall of the pan is shown in this view. Fig. 3 is a vertical section, lengthwise with respect to the crank casing, but showing the lower part of the flywheel housing with this invention applied thereto and shown also in section. The position of the oil indicator on the pan is also shown in this view, and the scale of drawing has been slightly increased to more clearly illustrate smaller parts. Fig. 4 is a cross-section vertically of the dashboard, showing the indicator thereon by which the operator may learn from his seat the depth of oil in the crank case. The scale of drawing is also increased in this view.

Throughout the drawings and description, the same letter is employed to refer to the same part.

Considering the drawings, the crank case A has the usual hollow cylindrical enlargement *a* found in motors of the type mentioned. The cylinder *a* has the dropped and cupped portion B, closed by the removable screw closure *b*, and forming the lowest part of the crank case. C and D are gage cocks for oil.

The protector or pan E, forming the main portion of this invention, has the depressed portion or cup *e* that fits the dropped portion B of the cylindrical enlargement *a* externally as best shown in Fig. 3. The pan has front and side walls. The front wall is marked F, and one means for holding the pan in place consists of strips, such as the strip *f* on the front wall of the pan, and having the upper extremity of the strip attached to the dash G, and the lower end to the wall F.

It will be observed in Figs. 1 and 3, that the pan E has a portion extending rearwardly beyond the cylinder *a*, and upon the extended rear portion of the pan the oil gage H is placed. The oil gage or receptacle H, may or may not have the sight glass *h* at one side, by which the depth of the oil in the casing may be seen at that point. From the oil gage H the tube J extends upwardly, and it is advantageous to have no abrupt bends in the tube J, and as few bends of any sort as may be, as the tube affords a passage for the light aluminum wire or ribbon *j* that is led to and exposed with the sight glass K on the dash G. The glass K may have indicating points, such as the point *g*, corresponding with certain oil levels in the casing A, and the glass may be protected by the ordinary sheet metal guard *k* as illustrated.

There has been described one means for holding the pan E in place, comprising the strips *f* attached to the pan and to the dash. The pan may also be secured by constructing the cup *e* in such manner that the edge portions thereof will pass between the screw *b* and the bottom of the cupped portion B of the casing, whereby the pan is clamped to the casing by the screw. It will be understood that by passing the screw plug *b* through the pan, as best illustrated in Fig. 3, the casing may be drained without displacing the pan. The pan may further be secured in position by means of an angle piece L, the same being secured to the pan and to a convenient portion of the crank casing. As previously stated herein, while the pan protects the oil receptacle, and is constructed and arranged for that purpose, it also prevents mud and dirt from reaching and injuring other exposed parts, such as the pet-cocks shown in Figs. 1 and 3.

In explaining the mode of operation of this invention, let it be assumed that the float m in the oil gage H is in its highest position due to a full charge of oil in the crank case, the high level of which will be indicated by means of the ribbon j attached to the float and extending into the glass K on the dash G.

It will be noted that the pan E by reason of its rearward extent protects not only the oil gage H, but, also, the gage cocks C and D of the crank case. I do not limit my invention to any particular form of oil gage or crank case, but have shown a Ford motor casing as best illustrating the invention set out.

Having now described this invention and explained the mode of its operation, what I claim is:—

1. In a motor oiler protector or the like, the combination with an engine casing having a portion extending downwardly lower than the remainder of the casing, a pan passing contiguously beneath the said portion of the casing, the said pan having a front wall extending upwardly in front of and adjacent to the said downwardly extending portion of the casing, the said pan having side walls, and means for securing the pan in place.

2. In a motor oiler protector or the like, the combination with an engine casing having a portion extending downwardly lower than the remainder of the casing, a pan passing contiguously beneath the said portion of the casing, the said pan having a front wall extending upwardly in front of and adjacent to the said downwardly extending portion of the casing, the said pan having side walls, an oil receptacle arranged upon the pan and having an oil gage, and means for securing the pan in place.

3. In a motor oiler protector or the like, the combination with an engine casing, of a pan arranged below the lowest portion of the casing, means for securing the pan to the casing, an oil receptacle arranged upon the pan, an oil indicator connected with the said receptacle, the said casing having a dropped cupped portion provided with a removable closure, the said pan having front and side walls and a rearwardly extending portion, the said pan having likewise a depressed or cupped portion constructed to externally fit the said cupped portions of the casing, the said depressed portion of the pan having an opening, and the said closure being arranged accessible through the said opening.

4. In a motor oiler protector or the like, the combination with an engine casing, of a pan arranged below the casing, the said pan having front and side walls and a rearwardly extending portion, an oil receptacle arranged upon the pan, an oil indicator connected with the said receptacle, the said casing having a lower portion provided with a removable member, and the said pan having an opening the edge portions whereof are arranged between the said member and the said casing whereby the pan is secured to the casing by the said member.

5. In a motor oiler protector or the like, the combination with an engine casing having an enlarged portion extending downwardly lower than the remainder of the casing, a pan passing contiguously beneath the said portion of the casing, the said pan having a front wall extending upwardly in front of and adjacent to the said portion of the casing, the said pan having side walls corresponding in shape with and arranged next to the sides of the said portion of the casing, and means for securing the said pan in place.

6. In a motor oiler protector or the like, the combination with an engine casing having a downwardly projecting portion, of a pan arranged below the said downwardly projecting portion of the casing and extending to rear thereof, means for securing the pan in position with respect to the said downwardly projecting portion of the casing, and means passing upwardly through the pan and into the said downwardly projecting portion of the casing for draining the casing.

In testimony whereof I affix my signature.

NOAH S. WRIGHT.